(12) United States Patent
Shaw et al.

(10) Patent No.: US 8,899,387 B2
(45) Date of Patent: Dec. 2, 2014

(54) VALVE ASSEMBLY

(75) Inventors: Edward G. Shaw, Inkberrow (GB);
Laurence J. Potter, Moseley (GB);
Robert D. Prescott, Solihull (GB)

(73) Assignee: Haldex Brake Products Limited (GB)

( * ) Notice: Subject to any disclaimer, the term of this patent is extended or adjusted under 35 U.S.C. 154(b) by 605 days.

(21) Appl. No.: 13/202,202

(22) PCT Filed: Feb. 17, 2010

(86) PCT No.: PCT/GB2010/050264
§ 371 (c)(1),
(2), (4) Date: Aug. 18, 2011

(87) PCT Pub. No.: WO2010/094962
PCT Pub. Date: Aug. 26, 2010

(65) Prior Publication Data
US 2011/0297494 A1   Dec. 8, 2011

(30) Foreign Application Priority Data

Feb. 21, 2009   (GB) .................................. 0902989.3

(51) Int. Cl.
| | | |
|---|---|---|
| *F15B 13/043* | (2006.01) | |
| *B60T 15/02* | (2006.01) | |
| *B60T 8/36* | (2006.01) | |
| *B60T 8/38* | (2006.01) | |
| *B60T 8/32* | (2006.01) | |

(52) U.S. Cl.
CPC ............. *B60T 8/361* (2013.01); *B60T 15/027*
(2013.01); *B60T 8/38* (2013.01); *B60T 8/327*
(2013.01)
USPC ................... 188/152; 137/627.5; 137/625.64; 137/596.16

(58) Field of Classification Search
USPC ............................. 137/627.5, 625.64, 596.16
See application file for complete search history.

(56) References Cited

U.S. PATENT DOCUMENTS 3,181,917 A * 5/1965 Dobrikin et al. ................. 303/40
3,752,190 A   8/1973 Brake
(Continued)

FOREIGN PATENT DOCUMENTS

| EP | 0 353 003 | 1/1990 |
|---|---|---|
| EP | 1255044 | 11/2002 |
| JP | 07-117646 | 5/1995 |

*Primary Examiner* — Thomas Irvin
(74) *Attorney, Agent, or Firm* — Young Basile Hanlon & MacFarlane P.C.

(57) ABSTRACT

A valve assembly including a housing (24') provided with an inlet port (12'), a delivery port (14'), and an exhaust port (16'), the valve assembly further including a first movable element (32'), a first valve member (34a') and a second valve member (26a'), the first movable element (32') being engageable with the first valve member (34a'), engagement of the first valve member (34a') and first movable element (32') substantially preventing flow of fluid between the inlet port (12') and the delivery port (14'), and the first movable element (32') also being engageable with the second valve member (26a'), engagement of the second valve member (26a') with the first movable element (32') substantially preventing flow of fluid between the delivery port (14') and the exhaust port (16'), the valve assembly further including a second movable element (26') which divides the housing (24') into a control chamber (22') and a main chamber (30') and which is movable relative to the housing (24') under the influence of fluid pressure in the control chamber (22') and main chamber (30'), wherein the first valve member (34a') extends from the housing (24') towards the first movable element (32') through an aperture provided in the second movable element (26').

19 Claims, 5 Drawing Sheets

(56) References Cited

U.S. PATENT DOCUMENTS

| | | | |
|---|---|---|---|
| 3,944,294 A * | 3/1976 | Masuda et al. | 303/40 |
| 6,053,205 A | 4/2000 | Feldmann | |
| 6,062,260 A * | 5/2000 | Yoshimura et al. | 137/596.16 |
| 7,147,006 B2 * | 12/2006 | Shaw et al. | 137/627.5 |
| 7,389,795 B2 * | 6/2008 | Potter et al. | 137/625.64 |
| 2005/0087243 A1 | 4/2005 | Shaw et al. | |
| 2006/0158029 A1 * | 7/2006 | Shaw et al. | 303/115.1 |
| 2012/0024642 A1 * | 2/2012 | Prescott et al. | 188/151 R |
| 2012/0031717 A1 * | 2/2012 | Prescott et al. | 188/151 R |
| 2013/0263953 A1 * | 10/2013 | Prescott et al. | 137/625.42 |

* cited by examiner

VALVE ASSEMBLY

CROSS-REFERENCE TO RELATED APPLICATION

This application is a U.S. national phase of PCT/GB2010/050264 filed Feb. 17, 2010, and claims priority to GB 0902989.3 filed Feb. 21, 2009, the disclosures of which are incorporated herein by reference for all purposes.

FIELD OF THE INVENTION

The present invention relates to a modulator, particularly, but not exclusively for use in a vehicle braking system.

BACKGROUND OF THE INVENTION

Vehicle braking systems typically include a valve assembly known as a modulator which is connected to a source of pressurised fluid, the modulator being used to regulate supply of pressurised fluid to and from a fluid pressure operated brake actuator. The modulator has a supply inlet which is connected to the source of pressurised fluid, a delivery port which is connected to the brake actuator and an exhaust outlet which is connected to the atmosphere (or any other low pressure volume), and can adopt a build position in which flow of fluid between the supply inlet and the delivery port is permitted, an exhaust position in which flow of fluid between the delivery outlet and the exhaust outlet is permitted, and a hold position in which flow of fluid between any two of the exhaust inlet, delivery port and exhaust outlet is substantially prevented.

In conventional braking systems, control of the modulator is achieved using a pressurised fluid signal known as the braking demand signal. When there is driver demand for braking, the driver typically operates a foot pedal, and movement of the foot pedal generates a fluid signal which is transmitted to a control inlet of the modulator. Receipt of the braking demand signal causes the modulator to move to the build position, so that the supply of pressurised fluid from the source of pressurised fluid to the brake actuator required to operate the vehicle brake commences. When the fluid pressure in the brake actuator exceeds a predetermined level relative to the pressure of the braking demand signal, the modulator moves to the hold or "lapped" position. Finally, when the driver releases the brake pedal, there is no longer demand for braking, the braking demand signal is removed, and the modulator reverts to the exhaust position, so that the pressurised fluid in the brake actuator acting to apply the vehicle brake is exhausted to the atmosphere.

If the vehicle is provided with anti-lock braking, the braking system includes at least one electrically operable valve which can override the braking demand signal. This is controlled using an electronic braking control unit (ECU) in accordance with conventional ABS control algorithms momentarily to release the brake pressure by moving the modulator to the exhaust position, or hold the brake pressure by moving the modulator to the hold position, even if there is braking demand, if wheel lock is detected.

In electronic braking systems, the braking system is provided with electrically operable hold and exhaust valves. Operation of the foot pedal generates an electrical braking demand signal, and this is transmitted to the ECU, which operates the hold valve and exhaust valve to control the modulator to build, hold or release the pressure in the brake actuator as described above. In this case, supply of fluid to the control inlet is also from the supply of pressurised fluid.

Figure 1:
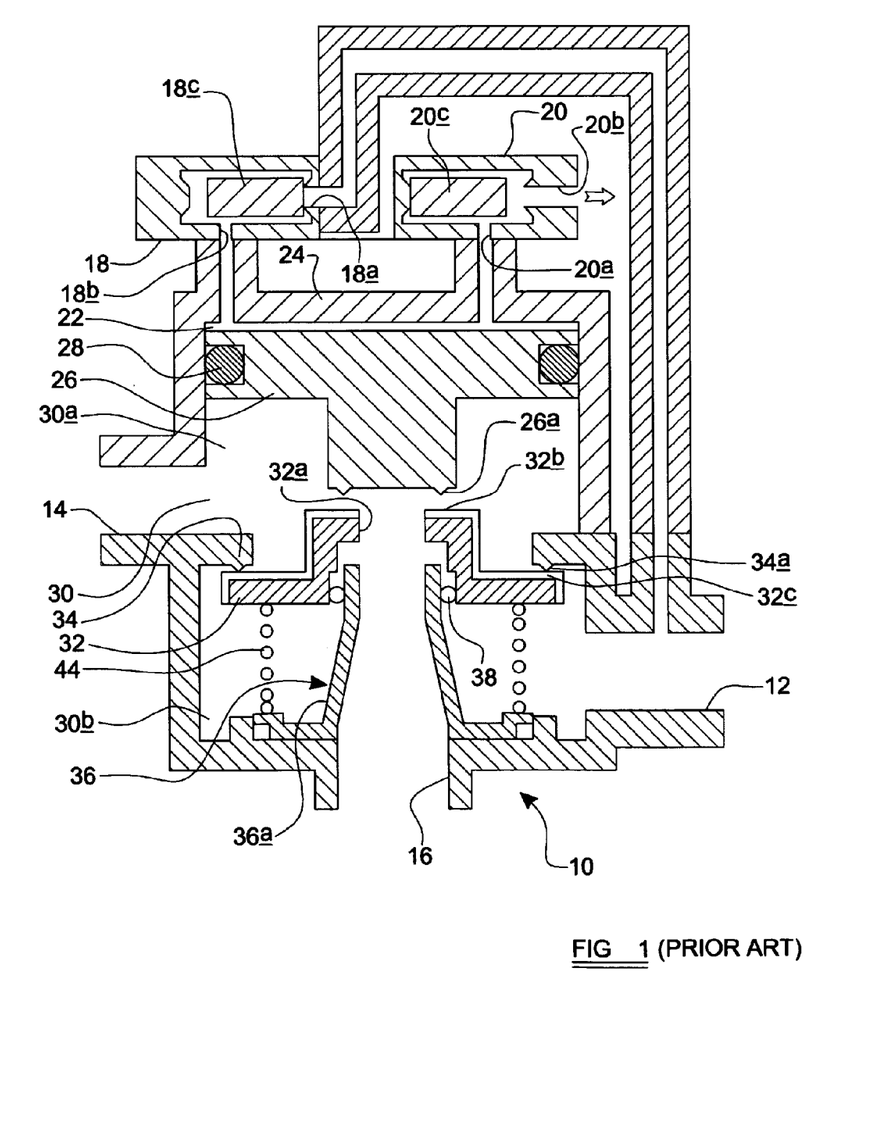
FIG. 1 shows a schematic illustration of the prior art modulator as described above.

An example of a prior art modulator 10 for use in a vehicle with an electronic braking system is shown in FIG. 1. The modulator 10 has a generally cylindrical housing having a supply inlet 12 which is adapted to be connected to a compressed air reservoir (not shown), a delivery port 14 which is adapted to be connected to a brake actuator (not shown), and an exhaust outlet 16 which in this example vents to atmosphere. It will be appreciated that the exhaust outlet 16 need not vent to atmosphere, and may instead be connected to an alternative low pressure volume which may be elsewhere in the vehicle braking system.

There is also shown a hold valve 18 which has an inlet 18a which is connected to the supply inlet 12 of the modulator 10, and an outlet 18b which is connected to a control chamber 22 of the modulator 10, and an exhaust valve 20 which has an inlet 20a which is connected to the control chamber 22 and an outlet 20b which vents to the atmosphere. The hold valve 18 has a valve member 18c which is movable from an open position in which flow of fluid between the supply inlet 12 and the control chamber 22 is permitted, and a closed position in which flow of fluid between the control chamber 22 and the supply inlet 12 is substantially prevented. Similarly, the exhaust valve 20 has a valve member 20c which is movable between an open position in which venting of fluid from the control chamber 22 to the atmosphere is permitted, and a closed position in which flow of fluid from the control chamber 22 to atmosphere is substantially prevented. Typically each of the valve members 18c, 20c is moved between the open and closed positions using electrical actuation means such as a solenoid or a piezoelectric element.

The control chamber 22 is located in the space between the modulator housing 24 and a first piston 26, hereinafter referred to as the control piston 26, which is movable within the housing 24 to vary the volume of the control chamber 22. A generally circular seal, which in this example is an O-ring 28 is provided in a circumferential grove around the control piston 26, and engages with the housing 24 to provide a substantially fluid tight seal between the housing 24 and the piston 26. It will be appreciated that the seal need not be an O-ring, and instead of having a generally circular cross-section, maybe X or Z—shaped in cross-section, or may comprise a lip seal or any other suitable sealing means which allows movement of the piston 26 relative to the housing 24 whilst providing a seal between the two parts.

The space within the housing 24 on the opposite side of the control piston 26 to the control chamber 22 is hereinafter referred to as the main chamber 30.

The supply inlet 12, delivery port 14 and exhaust outlet 16 each comprise an aperture in the housing 24 which is located on the opposite side of the first piston 26 to the control chamber 22, so that each enters the main chamber 30 of the modulator. A second piston 32, hereinafter referred to as the main piston 32, is provided in the main chamber 30.

The main piston 32 is provided with a central aperture 32a which extends through the main piston 32 from the side of the piston 32 adjacent the control piston 26 to the other. The area around this central aperture 32a provides a valve seat 32b, hereinafter referred to as the exhaust seat 32b. The face of the control piston 26 which forms an edge of the main chamber 30 is provided with a generally circular ridge 26a which has a larger diameter than the central aperture 32a in the main piston 32. The control piston 26 is movable in the housing 24 until the ridge 26a engages with the exhaust seat 32b, thus closing the central aperture 32a in the main piston 32.

A portion of the housing 24 forming the edges of the main chamber 30 is provided with a ledge 34 which extends around the entire housing 24 into the first sub-chamber 30a and which is provided with a generally circular ridge 34a which extends towards the main piston 32. The main piston 32 is movable into engagement with this ridge 34a, the portion of the main piston 32 engaging with the ridge 34a so as to substantially prevent flow of fluid between the main piston 32 and the housing 24, thus providing a valve seat hereinafter referred to as the reservoir seat 32c.

A spring 44 is provided which acts on the main piston 32, pushing the reservoir seat 32c against the ledge 34.

When the control piston 26 is engaged with the exhaust seat 32b, and the main piston 32 is engaged with the reservoir seat 34a, an annular chamber 30a is formed in the main chamber 30 between the control piston 26 and the main piston 32, and the delivery port 14 is arranged to communicate with the chamber 30a. In other words, the main piston 32 divides the main chamber 30 into two chambers—the annular chamber 30a into which the delivery port 14 opens and a further chamber 30b into which the supply inlet 12 opens.

In this further chamber 30b is provided a separator 36 which has a generally cylindrical portion 36a which extends from the housing 24 around the exhaust outlet 16 towards the central aperture 32a of the main piston 32. The internal diameter of the cylindrical portion 36a of the separator 36 is similar to the diameter of the central aperture 32a of the main piston 32, and an O-ring 38 is provided between the cylindrical portion 36a of the separator 36 and the main piston 32. The O-ring 38 provides a substantially fluid tight seal between the separator 36 and the main piston 32 which acts to ensure that flow of fluid into the exhaust can only occur via the central aperture 32b in the main piston 32, whilst allowing movement of the main piston 32 into and out of engagement with the ledge 34.

The supply inlet 12 opens into the volume surrounding the cylindrical portion of the separator 36.

Flow of fluid between these apertures is controlled by movement of the control piston 26 and the main piston 32 as follows.

When there is no braking demand, the hold valve 18 is in the closed position, and the exhaust valve 20 is in the open position. The control chamber 22 is therefore vented to atmosphere, and the control piston 26 is located such that the volume of the control chamber 22 is minimum. The reservoir seat 32c is engaged with the ledge 34 so that flow of fluid from the supply inlet 12 to the delivery port 14 is prevented, and the exhaust seat 32b is out of engagement with the control piston 26 so that flow of fluid from the delivery port 14 to the exhaust outlet 16 via the central aperture 32a in the main piston 32 is permitted. The delivery port 14, and hence the brake actuator, is therefore vented to atmosphere, and no pressure is being applied at the brake.

When a braking demand signal is received, the hold valve 18 is operated so that the valve member 18c moves to the open position, and the exhaust valve 20 is operated so that the valve member 20c moves to the closed position.

The control chamber 22 is therefore no longer venting to atmosphere, and flow of fluid from the reservoir into the control chamber 22 causes fluid pressure in the control chamber 22 to increase. The control piston 26 is acted on by this increasing pressure and moves towards the main piston to increase the volume of the control chamber 22. As the control piston moves, it comes into engagement with the exhaust seat 32b on the main piston 32. At this point, the delivery port 14 is no longer connected to the exhaust outlet 16. As the fluid pressure in the control chamber 22 continues to increase, when it reaches a certain point, the force of the fluid pressure in the control chamber 22 acting on the control piston 26 is sufficiently large that the control piston 26 carries on moving to increase the volume of the control chamber 22 and therefore pushes the main piston 32 against the biasing force of the spring 44 so that the reservoir seat 32c moves out of engagement with the ledge 34. At this point, the supply inlet 12 can communicate with the delivery port 14, and flow of fluid from the reservoir to the brake actuator commences. The modulator 10 is said to be in the "build configuration".

When the pressure in the brake actuator reaches the required level, and it is desired to hold that pressure, the hold valve 18 is operated to move the valve member 18c to the closed position. The control chamber 22 is therefore closed. As fluid continues to flow from the reservoir and into the modulator 10 via the supply inlet, fluid pressure in the main chamber 30 builds and acts on the control piston 26 against the pressure in the control chamber 22 to cause the control piston 26 to move back to reduce the volume of the control chamber 22. The main piston 32 may then move under the biasing force of the spring until the reservoir seat 32c comes into engagement with the ledge 34. At this point, flow of fluid from the reservoir to the brake actuator is prevented whilst the exhaust outlet remains closed, and the modulator 10 reaches an equilibrium at which the fluid pressure in all parts of the modulator 10 remains constant, and is said to be in the "hold configuration" or "lapped configuration".

To release the brake pressure, the exhaust valve 20 is operated to move the valve member 20c to the open position. The fluid in the control chamber 22 is vented to atmosphere, and the fluid pressure in the main chamber 30 of the modulator 10 acts on the control piston 26, pushing it out of engagement with the exhaust seat 32b. Fluid may then flow from the brake actuator into the delivery port 14, through the central aperture 32a of the main piston 32 and be vented to atmosphere via the exhaust outlet 16. The modulator thus returns to the "exhaust configuration".

It will be appreciated that when the hold valve 18 and the exhaust valve 20 are first operated to bring the modulator 10 from the exhaust configuration to the build configuration, movement of the main piston 32 to open the reservoir seat 32c will not commence until the pressure in the control chamber 22 is such that the force acting on the control piston 26 is sufficient to overcome the frictional forces between the control piston 26 and the housing 24, frictional forces between the main piston 32 and the separator 36, and, most significantly, the "energisation force" of the reservoir seat 32c. The "energisation force" of the reservoir seat 32c is the force pushing the main piston 32 against the ledge 34, and it has been found that to provide adequate sealing to substantially prevent leakage of fluid across the reservoir seat 32c an energisation force of the order of 1 N per millimeter of seat circumference is required.

In this case, the energisation of the reservoir seat 32c constitutes a combination of the force resulting from the fluid pressure at the supply inlet 12, i.e. the reservoir pressure, and the biasing force of the spring 44, and the area of the main piston 32 subject to the reservoir pressure and spring force can be tailored to provide the desired 1 N/mm energisation. For a standard sized modulator, in which the control piston 26 is around 92 mm in diameter, the force required to move the modulator 10 from the exhaust configuration to the build configuration is around 100N, which translates to a pressure in the control chamber 22 (referred to as "the cracking pressure") of around 0.25 bar. A cracking pressure of this level is generally considered to be acceptable—significantly higher cracking pressures would give rise to an unacceptable delay between initiation of the braking demand signal and the start of brake actuation.

A problem arises if this prior art configuration of modulator 10 is reduced in size—for example because it is desired to provide a modulator at each wheel, rather than one central modulator which operates a plurality of brake actuators. This is because the cracking pressure is inversely proportional to the square of the diameter of the control piston 26, and, whilst the reduction in modulator dimensions will result in a reduction in the total energisation and frictional forces, both these forces are proportional to the main piston diameter (not to its square). For example, if the diameter of the control piston 26 is reduced from 92 mm to 50 mm, with this configuration of modulator, the cracking pressure increases to around 1 bar. This is too high to be generally acceptable.

The disadvantages of the prior art are overcome by the present invention, and an improved valve assembly is hereinafter disclosed.

SUMMARY OF THE INVENTION

It is therefore an object of the present invention to provide an alternative configuration of the modulator which may be reduced in size whilst having an acceptable cracking pressure.

According to a first aspect of the invention we provide a valve assembly including a housing provided with an inlet port, a delivery port, and an exhaust port, the valve assembly further including a first movable element, a first valve member and a second valve member, the first movable element being engageable with the first valve member, engagement of the first valve member and first movable element substantially preventing flow of fluid between the inlet port and the delivery port, and the first movable element also being engageable with the second valve member, engagement of the second valve member with the first movable element substantially preventing flow of fluid between the delivery port and the exhaust port, the valve assembly further including a second movable element which divides the housing into a control chamber and a main chamber and which is movable relative to the housing under the influence of fluid pressure in the control chamber and main chamber, wherein the first valve member extends from the housing towards the first movable element through an aperture provided in the second movable element.

Preferably, the first valve member surrounds the inlet port.

The second valve member may be provided on the second movable element such that when the second movable element moves to increase the volume of the control chamber, the second valve member comes into engagement with the first movable element and, with a further increase in the volume of the control chamber, the second movable element pushes the first movable element away from the inlet and out of engagement with the first valve member.

Advantageously, the inlet port is provided in a portion of the housing enclosing the control chamber, and the valve member is provided in the main chamber.

The delivery port and the exhaust port are preferably provided in portions of the housing enclosing the main chamber.

The first movable element may be provided with an aperture, and a substantially fluid tight seal provided between the first movable element and the housing around the exhaust port such that fluid flow through the exhaust port can generally only occur via the aperture in the first movable element. In this case, when the first valve member engages with the first movable element, it may engage with a first valve seat provided on the first movable element, the first valve seat being provided on a valve seat support which is supported in the aperture provided in the first movable element. Furthermore, in this case, the valve seat support may extend into the aperture in the second movable element, and the second valve member may be provided on a tubular portion of the second movable element which extends around the valve seat support of the first movable element.

When the second valve member engages with the first movable element, it may engage with a second valve seat provided on the first movable element, the second valve seat extending around the aperture in the first movable element.

Advantageously, a spring is provided between the first movable element and an end face of the housing, the spring biasing the first movable element towards the second movable element.

The valve assembly may be provided with a control inlet which extends through the housing into control chamber. In this case, a preferably an electrically operable valve is provided which is operable to permit or substantially prevent flow of fluid into or out of the control inlet. Further, preferably, the control inlet is connected to the inlet port via the electrically operable valve.

The valve assembly may be provided with a secondary exhaust port which extends through the housing into the control chamber. In this case, the secondary exhaust port may be connected to a region of low pressure fluid via an electrically operable valve which is operable to permit or substantially prevent flow of fluid between the control chamber and the region of low pressure fluid.

According to a second aspect of the invention, we provide a vehicle braking system including a source of pressurised fluid, a fluid pressure operated brake actuator and a valve assembly according to the first aspect of the invention wherein the inlet port of the valve assembly is connected to the source of pressurised fluid, and the delivery port of the valve assembly is connected to the brake actuator.

The delivery port of the valve assembly may be connected to the brake actuator via at least one other valve assembly.

According to a third aspect of the invention, we provide a vehicle braking system including a mechanically operable braking demand device, a source of pressurised fluid, and a valve assembly according to any one of claims 1 to 16, wherein the inlet port of the valve assembly is connected to the source of pressurised fluid, and the braking demand device is mechanically connected to the second movable element of the valve assembly such that operation of the braking demand device causes movement of the second movable element relative to the housing of the valve assembly.

These and further features and advantages of the present invention will become apparent from the following detailed description, wherein reference is made to the figures in the accompanying drawings.

BRIEF DESCRIPTION OF THE DRAWINGS

An embodiment of the invention will now be described, by way of example only, and with reference to the accompanying figures, of which.

DETAILED DESCRIPTION OF THE INVENTION

Referring now to the figures, there is provided a modulator 10' according to the invention. The modulator 10' has many components in common with the prior art modulator 10 illustrated in FIG. 1, and the common components have been given the same reference number as in the prior art modulator.

Figure 2:
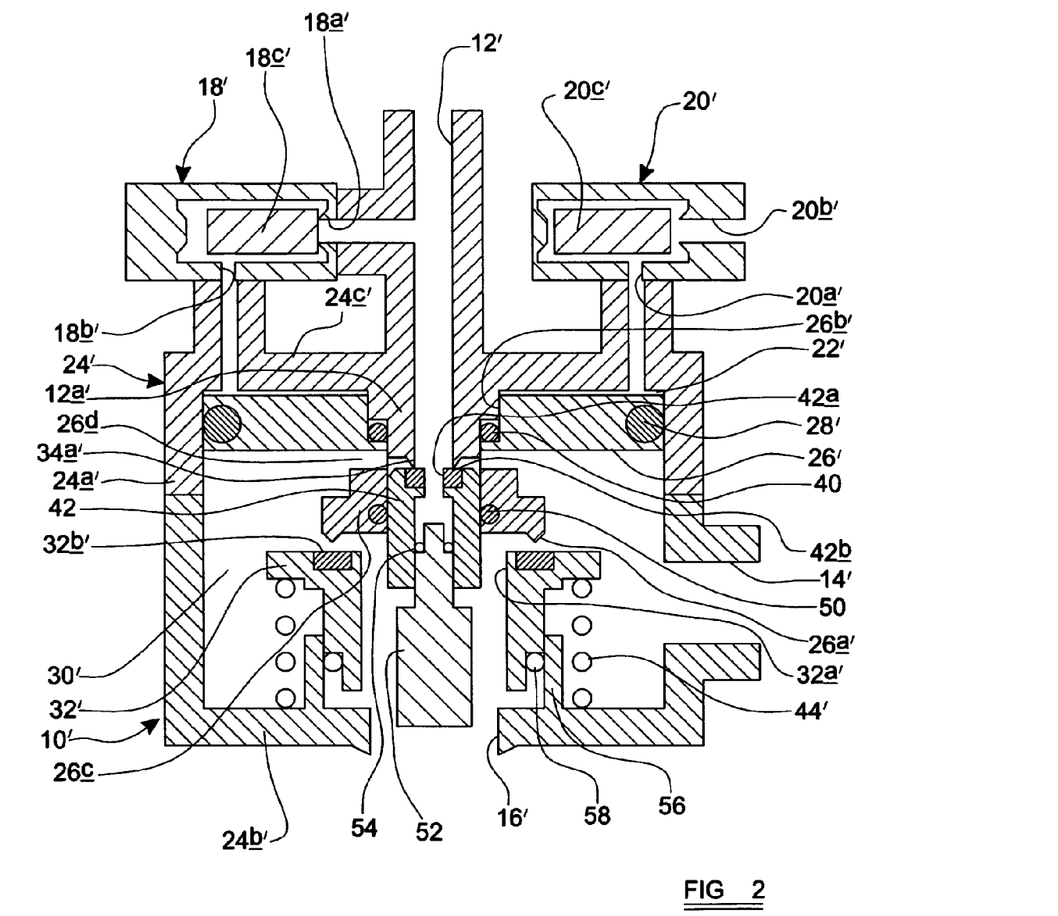
FIG. 2 shows a schematic illustration of a modulator including a valve assembly according to the invention in the exhaust configuration.

The modulator 10' includes a generally cylindrical housing 24' having a supply inlet 12' which is adapted to be connected to a compressed air reservoir (not shown), a delivery port 14' which is adapted to be connected to a brake actuator (not shown), and an exhaust port 16' which vents to atmosphere (or any other low pressure region).

There is also shown a hold valve 18' which has an inlet 18a' which is connected to the supply inlet 12' of the modulator 10', and an outlet 18b' which is connected to a control chamber 22' of the modulator 10', and an exhaust valve 20' which has an inlet 20a' which is connected to the control chamber 22' and an outlet 20b' which vents to the atmosphere. The hold valve 18' has a valve member 18c' which is movable from an open position in which flow of fluid between the supply inlet 12' and the control chamber 22' is permitted, and a closed position in which flow of fluid between the control chamber 22' and the supply inlet 12' is substantially prevented. Similarly, the exhaust valve 20' has a valve member 20c' which is movable between an open position in which venting of fluid from the control chamber 22' to the atmosphere is permitted, and a closed position in which flow of fluid from the control chamber 22' to atmosphere is substantially prevented. Typically each of the valve members 18c', 20c' is moved between the open and closed positions using an electrical actuator such as a solenoid or a piezoelectric element.

The control chamber 22' is located in the space between the modulator housing 24' and a first movable element, which could be a diaphragm but in this example is a piston 26', hereinafter referred to as the control piston 26', which is movable within the housing 24' to vary the volume of the control chamber 22'. A seal, in this example an O-ring 28', is provided in a circumferential grove in the piston 26' and engages with the side wall of the housing 24' to provide a substantially fluid tight seal between the housing 24' and the piston 26'. The space within the housing 24' on the opposite side of the control piston 26' to the control chamber 22' is hereinafter referred to as the main chamber 30'.

As with the prior art modulator 10, the supply inlet 12', delivery port 14' and the exhaust port 16' all comprise apertures in the housing 24' but only the delivery port 14' and exhaust port 16' are provided in the portions of the housing 24' enclosing the main chamber 30'. The supply inlet 12' is provided in a portion of the housing 24' enclosing the control chamber 22'. Specifically, as with the prior art modulator 10, the delivery port 14' comprises an aperture in the side wall 24a' of the housing 24', whilst the exhaust port 16' is located in an end face 24b' of the housing 24', the end face 24b' extending generally perpendicular to the direction of travel of the control piston 26' and the main chamber 30' being located between the end face 24b' and the control piston 26'. The supply inlet 12' is, however, positioned differently, and is located in a top face 24c' of the housing 24', the top face 24c' being opposite to the end face 24b' so that the control chamber 22' is located between the top face 24c' and the control piston 26'.

Of course, if the supply inlet 12' were simply an aperture through the housing 24', being located in this top face 24c' of the housing 24' would mean that it would communicate with the control chamber 22' rather than with the main chamber 30'. As such, a tubular extension 12a extends from the housing 24' around the aperture forming the supply inlet 12' into the control chamber 22', through generally central aperture 26b provided in the control piston 26' and into the main chamber 30'. A further seal, again in this example an O-ring 40 is provided in the aperture 26b in the control piston 26' to provide a substantially fluid tight seal between the control piston 26' and the outer diameter of the tubular extension 12a. Thus, movement of the control piston 26' relative to the modulator housing 24' is permitted whilst maintaining separation of the fluid in the control chamber 22' from the fluid in the main chamber 30'.

A second movable element, which could be a diaphragm, but in this example is a piston 32', hereinafter referred to as the main piston 32', is provided in the main chamber 30'. The main piston 32' is also movable relative to the housing 24' to increase or decrease the separation between it and the control piston 26'. A resilient biasing element, in this example a helical compression spring 44, is provided between the main piston 32' and the end face 24b' of the housing 24', the spring 44 being compressed when there is movement of the main piston 32' from its equilibrium position closest to the control piston 26' towards the end face 24b' of the housing 24' (i.e. away from the control piston 26').

The configuration of the main piston 32' is slightly different to that in the prior art arrangement in that, whilst the main piston 32' is provided with a central aperture 32a' which extends through the main piston 32' from the side of the piston 32' adjacent the control piston 26' to the other, in the aperture 32a' is mounted a tubular reservoir seat support 42. The reservoir seat support 42 has a smaller diameter than the aperture 32a', is supported in the aperture 32a' by at least two support arms (not visible in the cross-section shown in the figures) and extends towards the control piston 26'. At the end of the reservoir seat support 42 is provided a reservoir seat 42b which is a generally annular portion of the end surface of the reservoir seat support 42 which surrounds a central bore 42a extending axially through the seat support 42.

Into the central bore 42a of the reservoir seat support 42 extends a reduced diameter portion of a guide spigot 52 which is supported in the exhaust port 16' by a plurality of support arms (not shown in the cross-sectional view illustrated in the figures). The outer diameter of the reduced diameter portion of the guide spigot 52 is just slightly less than the diameter of the central bore 42a, and yet another seal, which is again in this example an O-ring 54 is provided to ensure that there is a generally fluid tight seal between the guide spigot 52 and the reservoir seat support 42. This means that any fluid entering the central bore 42a of the reservoir seat support 42 cannot escape and, in particular, cannot pass into the exhaust port 16'.

As mentioned above, the main piston 32' is biased by the spring 44 towards the control piston 26' such that, when there are no other forces acting on the main piston 32', the reservoir seat 42b is urged into engagement with a generally circular ridge 34a' provided at the end of the tubular extension 12a which extends into the main chamber 30'. The ridge 34a' surrounds the aperture of the supply inlet 12', so it will be appreciated that when the main piston 32' is in this position, fluid at the supply inlet 12' is substantially restricted to flowing into the central aperture 32a of the reservoir seat support 42, where it is trapped by the guide spigot 52. As such, bringing the reservoir seat 42b into engagement with this ridge 34a' amounts to closing of the supply inlet 12'.

Typically the main piston 32' and reservoir seat support 42 are made from a generally rigid material, which may be a metallic or plastics material, and if this is the case, the reservoir seat 42b may constitute a rubber insert which may become deformed when engaged with the ridge 34a' to improve the quality of the seal provided by the reservoir seat 42b.

The central bore 42a of the reservoir seat support 42 increases in diameter between the end on which the reservoir seat 42b is provided, and the portion engaged with the guide spigot 52, the diameter of the portion engaged with the guide spigot 52 having generally the same diameter as the internal diameter of the ridge 34a' of the tubular extension 12a which is engaged with the reservoir seat 42b. Configuring the central bore 42a this way, and allowing fluid at the supply inlet 12' to pass into the central bore 42a ensures that, when the reservoir seat 42b is closed, there is no net force exerted on the main piston 32' by the reservoir pressure. In other words, the reservoir pressure does not contribute to the energisation of the reservoir seat 42b.

It should be appreciated that whilst this arrangement is advantageous in substantially eliminating the effect of reservoir pressure on the energisation of the reservoir seat, the central bore 42a need not extend all the way through the reservoir seat support 42. The reservoir seat 42b may be provided on a generally circular end cap. In this case, however, it will be appreciated that when the ridge 34a' is engaged with the reservoir seat 42b, reservoir pressure will tend to push the main piston 32' downwards. The strength of the spring 44' would therefore have to be selected to prevent the reservoir pressure pushing the reservoir seat 42b out of engagement with the ridge 34a'.

As in the prior art arrangement, the area around the central aperture 32a' in the main piston 32' also provides a valve seat 32b', hereinafter referred to as the exhaust seat 32b'. Again, the face of the control piston 26' which forms a boundary of the main chamber 30' is provided with a generally circular ridge 26a' which has a larger diameter than the central aperture 32a' in the main piston 32', and the control piston 26' is movable in the housing 24' until the ridge 26a' engages with the exhaust valve seat 32b', thus substantially preventing flow of fluid from around the main piston 32' into the central aperture 32a' of the main piston 32'.

As mentioned previously, typically the main piston 32' is made from a generally rigid material, typically a metal or plastics material and, in this case, the exhaust seat 32b' may constitute a rubber insert which may become deformed when engaged with the ridge 26a' to improve the seal provided by the exhaust seat 32b'.

Unlike the prior art arrangement, however, the ridge 26a' is provided on a tubular extension portion 26c of the control piston 26' which extends from around the central aperture 26b towards the main piston 32'. The reservoir seat support 42 extends into a central bore of the tubular extension portion 26c of the control piston 26', with a seal, in this example an O-ring 50, being provided in a circumferential groove provided in the inner surface of the tubular extension portion 26c of the control piston 26' to provide a generally fluid tight seal between the tubular extension portion 26c and the reservoir seat support 42.

The tubular extension portion 26c of the control piston 26' is provided with a plurality of transverse apertures 26d which extend from the central bore to the exterior of the tubular extension portion 26c. Thus, when the main piston 32' is positioned such that the tubular extension 12a of the supply inlet 12' is spaced from the reservoir seat 42b, fluid can flow from the source of pressurised fluid, through the supply inlet 12' and the transverse apertures 26d of the control piston 26', into the main chamber 30, and on to the delivery port 14'.

The central aperture 32a' of the main piston 32' is aligned with and slightly larger in diameter than the exhaust port 16'. A generally circular sealing flange 56 extends from the end face 24b' of the housing 24' from around the exhaust port 16', the main piston 32' being partially located within the sealing flange 56 so that the outer surface of the main piston 32' engages with the inner surface of the sealing flange 56. A further seal, again, in this example an O-ring 58, is located between the two parts to provide a substantially fluid tight seal, and, as a result, flow of fluid to the exhaust port 16' from the main chamber 30' of the modulator 10' can only occur via the central aperture 32a' of the main piston 32'. It will therefore be appreciated that, by virtue of this arrangement, bringing the exhaust seat 32b' into engagement with the ridge 26a' on the control piston 26' amounts to closing of the exhaust port 16'.

Flow of fluid between these apertures is controlled by movement of the control piston 26' and the main piston 32' in an identical way to the prior art modulator 10 and as follows.

When there is no braking demand, the modulator adopts the exhaust configuration as illustrated in FIG. 2. The hold valve 18' is in the closed position, and the exhaust valve 20' is in the open position. The control chamber 22' is therefore vented to atmosphere, and the control piston is located such that the volume of the control chamber 22' is minimum. The reservoir seat 42b is engaged with the tubular extension 12a of the supply inlet 12' so that flow of fluid from the supply inlet 12' to the delivery port 14' is substantially prevented, and the exhaust seat 32b' is spaced from the control piston 26' so that flow of fluid from the delivery port 14' to the exhaust port 16' via the central aperture 32a' in the main piston 32' is permitted. The delivery port 14', and hence the brake actuator, is therefore vented to atmosphere, and no pressure is being applied at the brake.

When a braking demand signal is received, the hold valve 18' is operated so that the valve member 18c' moves to the open position, and the exhaust valve 20' is operated so that the valve member 20c' moves to the closed position. The control chamber 22' is therefore no longer venting to atmosphere, and flow of fluid from the reservoir into the control chamber 22' causes fluid pressure in the control chamber 22' to increase. The control piston 26' is acted on by this increasing pressure and moves towards the main piston 32' to increase the volume of the control chamber 22'. As the control piston 26' moves, it comes into engagement with the exhaust seat 32b' on the main piston 32'. At this point, the delivery port 14' is no longer connected to the exhaust port 16'.

Figure 3:
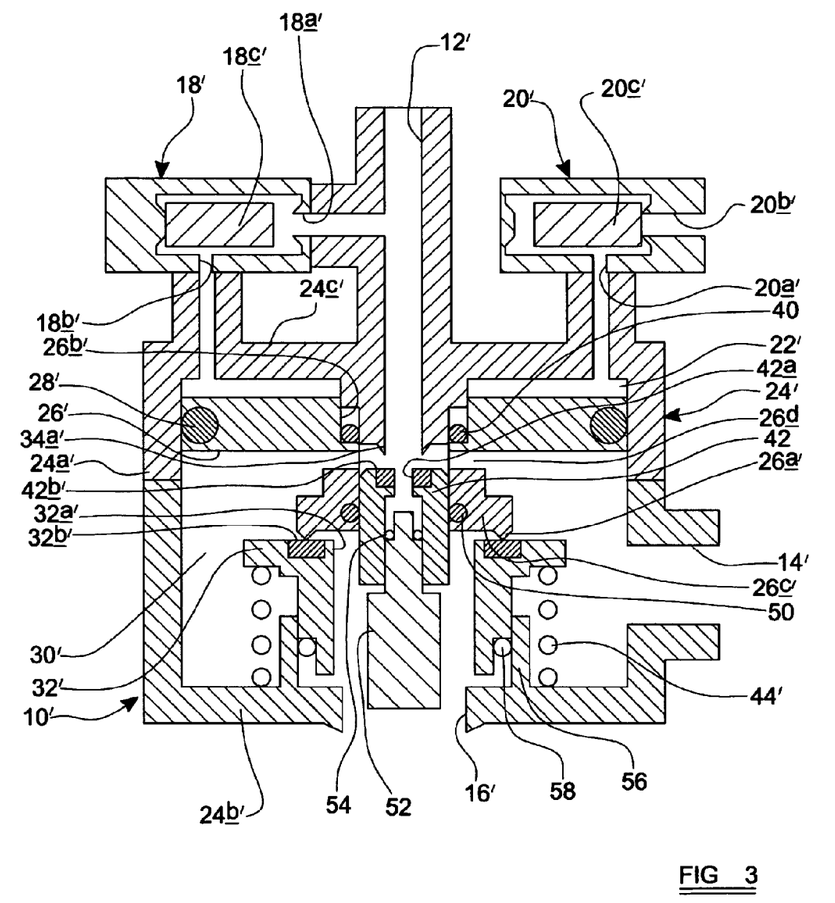
FIG. 3 shows a schematic illustration of the modulator shown in FIG. 2 but in the build configuration.

As the fluid pressure in the control chamber 22' continues to increase, when it reaches a certain point, the force of the fluid pressure in the control chamber 22' acting on the control piston 26' is sufficiently large that the control piston 26' carries on moving to increase the volume of the control chamber 22' and therefore pushes the main piston 32' against the biasing force of the spring 44 so that the reservoir seat 42b moves out of engagement with the tubular extension 12a of the supply inlet 12'. At this point, the supply inlet 12' can communicate with the delivery port 14', and flow of fluid from the reservoir to the brake actuator commences. The modulator 10' is said to be in the "build configuration", as illustrated in FIG. 3.

Figure 4:
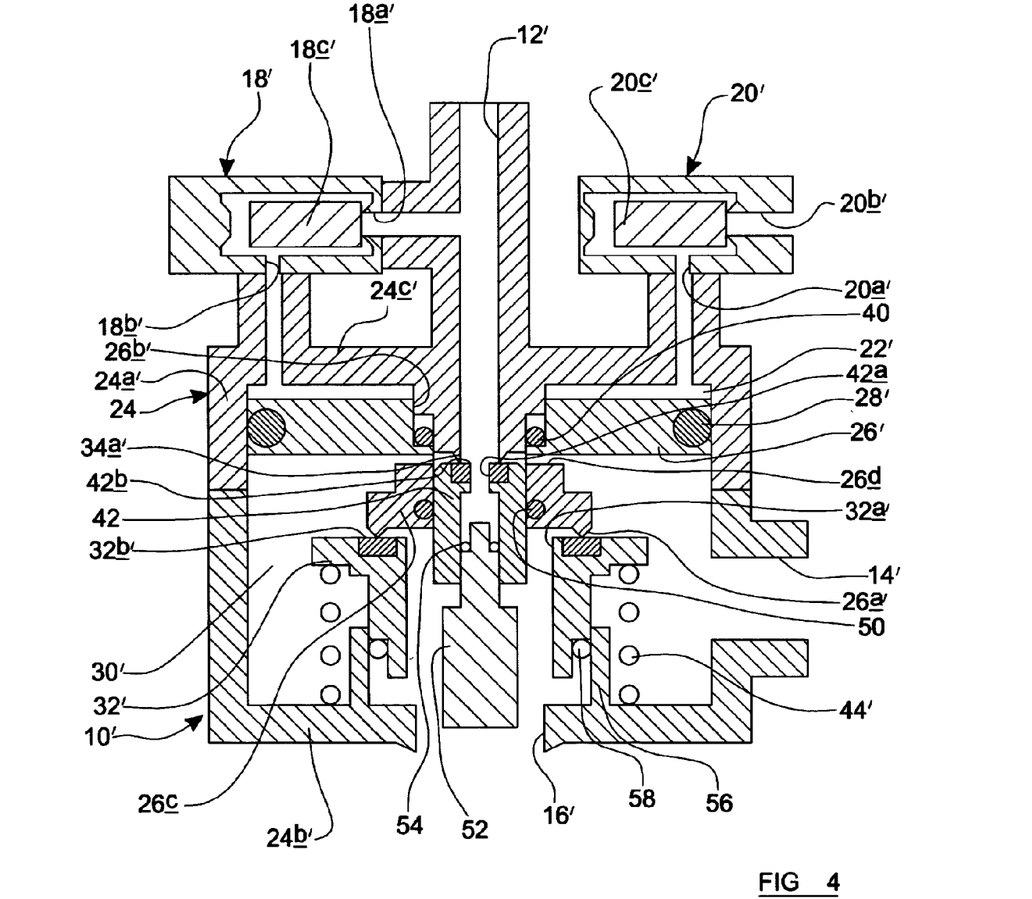
FIG. 4 shows a schematic illustration of the modulator shown in FIG. 2 in the hold configuration.

When the pressure in the brake actuator reaches the required level (this is typically determined using a pressure transducer which measures the delivery pressure in the brake actuator), and it is desired to hold that pressure, the hold valve 18' is operated to move the valve member 18c' to the closed position. The control chamber 22' is therefore closed. As fluid continues to flow from the reservoir and into the modulator 10' via the supply inlet 12', fluid pressure in the main chamber 30' increases, and acts on main piston 32' and the control piston 26' against the pressure in the control chamber 22' to cause the pistons 26', 32' to move back to reduce the volume of the control chamber 22' until the reservoir seat 42b comes into engagement with the tubular extension 12a of the supply inlet 12'. At this point, flow of fluid from the reservoir to the brake actuator is substantially prevented whilst the exhaust port 16' remains closed, and the modulator 10' reaches an equilibrium at which the fluid pressure in all parts of the modulator 10' remains constant. The modulator 10' is then said to be in the "hold configuration" as illustrated in FIG. 4.

To release the brake pressure, the exhaust valve 20' is operated to move the valve member 20c' to the open position. The fluid in the control chamber 22' is vented to atmosphere, and the fluid pressure in the main chamber 30' of the modulator 10' acts on the control piston 26', pushing it out of engagement with the exhaust seat 32b'. Fluid may then flow from the brake actuator into the delivery port 14', through the central aperture 32a' of the main piston 32' and be vented to atmosphere via the exhaust port 16'. The modulator 10' thus returns to the "exhaust configuration" as illustrated in FIG. 2.

Whilst the general principal of operation of the inventive modulator 10' is identical to the prior art modulator 10, there are significant differences in relation to the various forces acting on the pistons 26', 32' during modulator operation. These arise essentially because the ratio of the diameter of the reservoir seat 42b to the diameter of the control piston 26', is very much smaller than in the prior art modulator 10, which is possible by virtue of having the reservoir seat 42b extend from the housing 24' through an aperture provided in the control piston 26' and arranging the reservoir seat 42b inwardly of the exhaust seat 32b'.

As the diameter of the reservoir seat 42b is, in this configuration of modulator 10', as small as possible without restricting flow through the supply inlet 12', the spring force required to provide a seat energisation of 1 N/mm is relatively small, and the control chamber pressure required to overcome this small spring force is also relatively low, despite the reduced diameter control piston 26'. It has been found that it is possible to reduce the control piston diameter to 50 mm, whilst retaining a reservoir seat energisation of 1 N/mm, and to achieve a cracking pressure around 0.2 bar using the new configuration of modulator 10'.

Whilst it will be appreciated that the modulator 10' described above is suitable for use in a conventional electronic vehicle braking system, as the control signal input into the control chamber 22' is derived from the source of pressurised fluid which is also used to actuate the brakes, it is not restricted to use in such a system. It should be appreciated that the modulator 10' could also be used in a non-electronic braking system (with or without anti-lock braking control) in which the control signal input into the control chamber 22' is derived from a fluid pressure braking demand signal which is generated as a result of the operation of the brake pedal. The modulator 10' may also be used in a hybrid system in which the control signal input into the control chamber 22' may either be derived from the source of pressurised fluid, or from a fluid pressure braking demand signal. In this case, the system also includes an additional valve which is operable to either direct fluid from the source of pressurised fluid to the hold valve 18', or to direct the fluid pressure braking demand signal to the hold valve 18'.

Similarly, the delivery port 14' need not be connected directly to a brake actuator, and it may be connected to an inlet port of a further valve assembly (not necessarily according to the invention) such as a relay valve.

Figure 5:
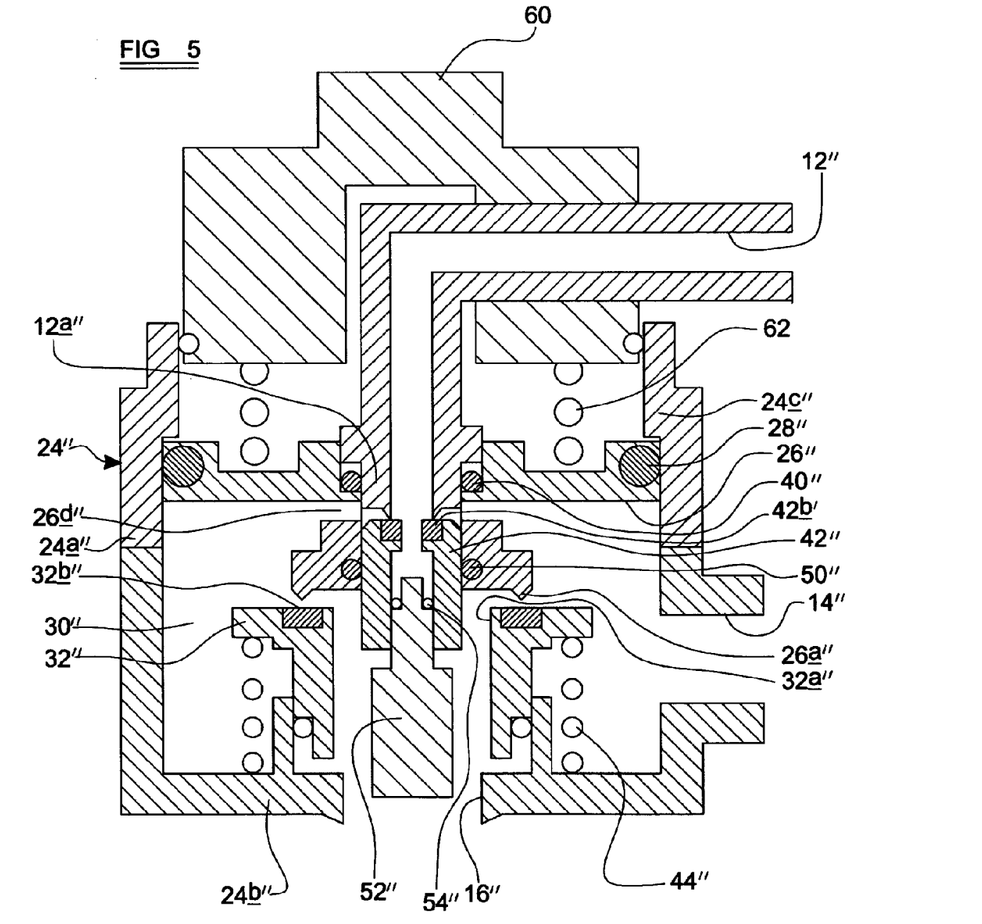
FIG. 5 shows a schematic illustration of a brake pedal valve assembly according to the invention.

The valve assembly according to the invention may alternatively be used in a brake pedal assembly for a vehicle braking system, as illustrated in FIG. 5. In this case, the valve assembly is in all respects identical to the valve assembly described on pages 9 to 19 above, except that movement of the control piston 26" is effected by virtue of a mechanical connection between the control piston 26" and the brake pedal 60 rather than by fluid pressure control using hold valve 18 and exhaust valve 20. In this example the top face 24c" of the housing 24" is substantially open, and a portion of the brake pedal 60 extends into the housing 24" via the aperture in the top face 24c". A spring 62 is provided between the brake pedal 60 and the control piston 26", to provide a degree of comfort for the driver whilst ensuring that movement of the brake pedal 60 causes movement of the control piston 26".

In this case, rather than being connected directly to a brake actuator, the delivery port 14" is connected to a braking demand signal line, which is, in a purely pneumatic or hydraulic braking system, connected to the supply inlet of a modulator. Movement of the brake pedal may, therefore, control flow of pressurised fluid into the braking system, the flow of pressurised fluid thus comprising a pneumatic or hydraulic braking pressure demand signal.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A valve assembly, comprising:
a housing provided with an inlet port, a delivery port, and an exhaust port;
a first movable element, a first valve member and a second valve member, the first movable element being engageable with the first valve member, engagement of the first valve member and first movable element substantially preventing flow of fluid between the inlet port and the delivery port, and the first movable element also being engageable with the second valve member, engagement of the second valve member with the first movable element substantially preventing flow of fluid between the delivery port and the exhaust port; and
a second movable element which divides the housing into a control chamber and a main chamber and which is movable relative to the housing under the influence of fluid pressure in the control chamber and main chamber, wherein the first valve member extends from the housing towards the first movable element through an aperture provided in the second movable element.

2. A valve assembly according to claim 1, wherein the first valve member surrounds the inlet port.

3. A valve assembly according to claim 1, wherein the second valve member is provided on the second movable element such that when the second movable element moves to increase the volume of the control chamber, the second valve member comes into engagement with the first movable element and, with a further increase in the volume of the control chamber, the second movable element pushes the first movable element away from the inlet and out of engagement with the first valve member.

4. A valve assembly according to claim 1, wherein the inlet port is provided in a portion of the housing enclosing the control chamber, and the valve member is provided in the main chamber.

5. A valve assembly according to claim 1, wherein the delivery port and the exhaust port are provided in portions of the housing enclosing the main chamber.

6. A valve assembly according to claim 1, wherein the first movable element is provided with an aperture, and a substantially fluid tight seal is provided between the first movable element and the housing around the exhaust port such that fluid flow through the exhaust port only occurs via the aperture in the first movable element.

7. A valve assembly according to claim 6 wherein, when the first valve member engages with the first movable element, it engages with a first valve seat provided on the first movable element, the first valve seat being provided on a valve seat support which is supported in the aperture provided in the first movable element.

8. A valve assembly according to claim 7, wherein the valve seat support extends into the aperture in the second movable element.

9. A valve assembly according to claim 8, wherein the second valve member is provided on a tubular portion of the second movable element which extends around the valve seat support of the first movable element.

10. A valve assembly according to claim 6, wherein when the second valve member engages with the first movable element, it engages with a second valve seat provided on the first movable element, the second valve seat extending around the aperture in the first movable element.

11. A valve assembly according to claim 1, wherein a spring is provided between the first movable element and an end face of the housing, the spring biasing the first movable element towards the second movable element.

12. A valve assembly according to claim 1, wherein the valve assembly is provided with a control inlet which extends through the housing into the control chamber.

13. A valve assembly according to claim 12, wherein an electrically operable valve is provided which is operable to permit or substantially prevent flow of fluid into or out of the control inlet.

14. A valve assembly according to claim 13, wherein the control inlet is connected to the inlet port via the electrically operable valve.

15. A valve assembly according to claim 9, wherein the valve assembly is provided with a secondary exhaust port which extends through the housing into the control chamber.

16. A valve assembly according to claim 15, wherein the secondary exhaust port is connected to a region of low pressure fluid via an electrically operable valve which is operable to permit or substantially prevent flow of fluid between the control chamber and the region of low pressure fluid.

17. A vehicle braking system including a source of pressurized fluid, a fluid pressure operated brake actuator and a valve assembly according to claim 1, wherein the inlet port of the valve assembly is connected to the source of pressurized fluid, and the delivery port of the valve assembly is connected to the brake actuator.

18. A vehicle braking system according to claim 17, wherein the delivery port of the valve assembly is connected to the brake actuator via at least one other valve assembly.

19. A vehicle braking system including a mechanically operable braking demand device, a source of pressurized fluid, and a valve assembly according to claim 1, wherein the inlet port of the valve assembly is connected to the source of pressurized fluid, and the braking demand device is mechanically connected to the second movable element of the valve assembly such that operation of the braking demand device causes movement of the second movable element relative to the housing of the valve assembly.

* * * * *